US009734398B2

United States Patent
Chen et al.

(10) Patent No.: US 9,734,398 B2
(45) Date of Patent: Aug. 15, 2017

(54) METHOD AND APPARATUS FOR IDENTIFYING OBJECT

(71) Applicant: University of Electronic Science and Technology of China, Chengdu (CN)

(72) Inventors: Yunping Chen, Chengdu (CN); Ling Tong, Chengdu (CN); Weihong Han, Chengdu (CN)

(73) Assignee: UNIVERSITY OF ELECTRONIC SCIENCE AND TECHNOLOGY OF CHINA, Chengdu, Sichuan (CN)

( * ) Notice: Subject to any disclaimer, the term of this patent is extended or adjusted under 35 U.S.C. 154(b) by 6 days.

(21) Appl. No.: 14/958,369

(22) Filed: Dec. 3, 2015

(65) Prior Publication Data

US 2016/0379053 A1 Dec. 29, 2016

(30) Foreign Application Priority Data

Jun. 23, 2015 (CN) .......................... 2015 1 0349616

(51) Int. Cl.
*G06K 9/00* (2006.01)
*G06K 9/46* (2006.01)
(Continued)

(52) U.S. Cl.
CPC ....... *G06K 9/00637* (2013.01); *G06K 9/3241* (2013.01); *G06K 9/4604* (2013.01);
(Continued)

(58) Field of Classification Search
CPC ............. G06K 9/00637; G06K 9/3241; G06K 9/4604; G06T 7/13; G06T 2207/10032; G06T 2207/30184
See application file for complete search history.

(56) References Cited

U.S. PATENT DOCUMENTS

| 2002/0028019 A1* | 3/2002 | Hemiari | G06K 9/4604 382/190 |
| 2005/0031191 A1* | 2/2005 | Venkatachalam | G06K 9/4633 382/152 |
| 2015/0206025 A1* | 7/2015 | Chen | G06T 5/00 382/202 |

OTHER PUBLICATIONS

Zhu et al., "A Double-Side Filter Based Power Line Recognition Method for UAV Vision System", Proceeding of the IEEE International Conference on Robotics and Biomimetics, 2013, 2655-2660.*

(Continued)

*Primary Examiner* — Katrina Fujita
(74) *Attorney, Agent, or Firm* — Howison & Arnott, LLP

(57) ABSTRACT

A method and apparatus for identifying an object are disclosed. The method includes: performing linear feature detection on an image to be identified by using a linear feature detecting method to obtain detected linear features, wherein the linear feature detection method transforms detection of linear features in an image space to detection of extremal points in another space and assigns larger weights to continuous image points than to discrete image points during the transformation by using a continuous cluster factor; and identifying an object to be identified from the detected linear features by considering characteristics of the object to be identified. The method and apparatus for identifying an object of the invention, when used to detect and identify weak linear objects in high resolution remote sensing images, can effectively suppress the system noise and ambient noise, thereby successfully identifying the interested object and avoiding false alarms. Moreover, short line segments can also be identified.

14 Claims, 11 Drawing Sheets

(51) Int. Cl.
*G06T 7/00* (2017.01)
*G06K 9/32* (2006.01)
*G06T 7/13* (2017.01)

(52) U.S. Cl.
CPC ...... *G06T 7/13* (2017.01); *G06T 2207/10032* (2013.01); *G06T 2207/30184* (2013.01)

(56) References Cited

OTHER PUBLICATIONS

Copeland et al., "Localized Radon Transform-Based Detection of Ship Wakes in SAR Images", IEEE Transactions on Geoscience and Remote Sensing, vol. 33, Iss:1, 1995, 35-45.*
Li et al., "Knowledge-based power line detection for UAV surveillance and inspection systems", I. IVCNZ 2008.*
Courmontagne et al., "An improvement of ship wake detection based on the radon transform", Signal Processing 85 (2005) 1634-1654.*
Yan et al., "Automatic Extraction of Power Lines From Aerial Images", IEEE Geoscience and Remote Sensing Letters vol. 4, Iss: 3, 2007, 387-391.*
Zhang et al., "High speed Automatic Power Line Detection and Tracking for a UAV-Based Inspection", ICICEE 2012.*

* cited by examiner

METHOD AND APPARATUS FOR IDENTIFYING OBJECT

CROSS-REFERENCE TO RELATED APPLICATIONS

This application claims priority to and/or benefit from Chinese Application No. 201510349616.4, filed on Jun. 23, 2015, the specification of which is incorporated by reference herein in its entirety.

TECHNICAL FIELD

The present invention relates to the field of image processing, more particularly, to a method and apparatus for identifying an object.

BACKGROUND

There are various geographic linear features in remote sensing images, such as roads, railways, rivers, coastlines and the like. Identification of linear features from remote sensing images is a topic attracting much interest from researchers. Due to the significance of roads and the need of updating Geographic Information Systems (GIS), scientists and researchers used to pay much attention to road extraction. During the past several decades, many researchers proposed different methods to extract road information from high resolution remote sensing images such as aerial imagery, synthetic aperture radar (SAR) images and satellite images.

Another important object in remote sensing images is power transmission lines. Conventionally, research focused mainly on extracting information of power transmission lines from LiDAR images, helicopter aerial images, and unmanned aerial vehicle (UAV) optical images. Such information is used to inspect power transmission lines to guarantee the safety of power transmission and distribution lines as well as that of the related equipment. Up until now, there is little research on extracting power lines from remote sensing satellite images.

Rapid development of space technology over the past decade makes it possible to take satellite images with very high resolutions. Many commercial satellites have achieved spatial resolutions in the range of sub-meter and the revisit cycle has also shortened to one day. Currently, the most commonly used high resolution commercial satellites include QuickBird, GeoEye-1 and Worldview, and the highest achievable resolution is 0.31 meter. It is expected that higher resolution will be available in the future, which makes it possible to inspect power transmission lines by using the satellite sensing technologies. To this end, it has to extract linear features from remote sensing images.

However, power transmission lines are very weak linear objects in remote sensing images and have the characteristics of having fine dimension (in the order of sub-meters) and complicated backgrounds. Due to such facts, various problems such as false alarms are caused when using conventional technologies to identify such weak objects, with very strong ambient noise and system noise surrounding the objects to be identified. Moreover, conventional linear object identification methods have difficulty in handling short line segments. Therefore, there needs a method and apparatus for identifying weak linear objects from high resolution remote sensing images and it is desirable that such a method and apparatus can identify short line segments as well.

SUMMARY

An objective of the present invention is to propose a method and apparatus for identifying an object from an image, such that identification of very weak linear objects from images having sub-pixels, weak objects and complicated background is feasible.

To this end, a first aspect of the invention provides a method for identifying an object, comprising:

performing linear feature detection on an image to be identified by using a linear feature detecting method to obtain detected linear features, wherein the linear feature detection method transforms detection of linear features in an image space to detection of extremal points in another space and assigns larger weights to continuous image points than to discrete image points during the transformation by using a continuous cluster factor; and identifying an object to be identified from the detected linear features by considering characteristics of the object to be identified.

As an example, the method further comprises performing image enhancement and edge detection on the image to be identified before the linear feature detection to eliminate influence of bright surface objects on the detection.

As an example, the continuous cluster factor is in reverse proportion to the difference between adjacent image points along a two-dimensional direction of the image to be identified.

As an example, the continuous cluster factor is in proportion to a sum of continuous image points having similar or equal value along a two-dimensional direction of the image to be identified.

As an example, the transformation from the image space to the other space is done through Radon or Hough transform.

As an example, the characteristics of the object to be identified comprises at least one of the following:

i) long and straight, covering part of the image to be identified or running through the image to be identified;
ii) having a width of 1 to 2 pixels;
iii) being parallel to each other; and
iv) having similar background in-between and on both sides As an example, the object to be identified is power transmission lines.

As an example, the object to be identified is ship wake.

A further aspect of the invention provides an apparatus for identifying an object. The apparatus comprises:

a linear feature detection module for detecting linear features of an image to be identified to obtain detected linear features, wherein detecting the linear features transforms detection of linear features in image space to detection of extremal points in another space and assigns larger weights to continuous image points than to discrete image points during the transformation by using a continuous cluster factor; and an object identification module for identifying an object to be identified from the detected linear features by considering characteristics of the object to be identified.

As an example, the apparatus for identifying an object further comprises an enhancement module for enhancing the image to be identified.

As an example, the apparatus for identifying an object further comprises an edge detection module for performing edge detection on the image to be identified.

The method and apparatus for identifying objects of the invention make it possible to effectively suppress the ambient noise and system noise when detecting and identifying weak linear objects from high resolution remote sensing images, allowing successful identification and extraction of the objects while preventing false alarms. Moreover, the method and apparatus of the invention can also identify short line segments successfully.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
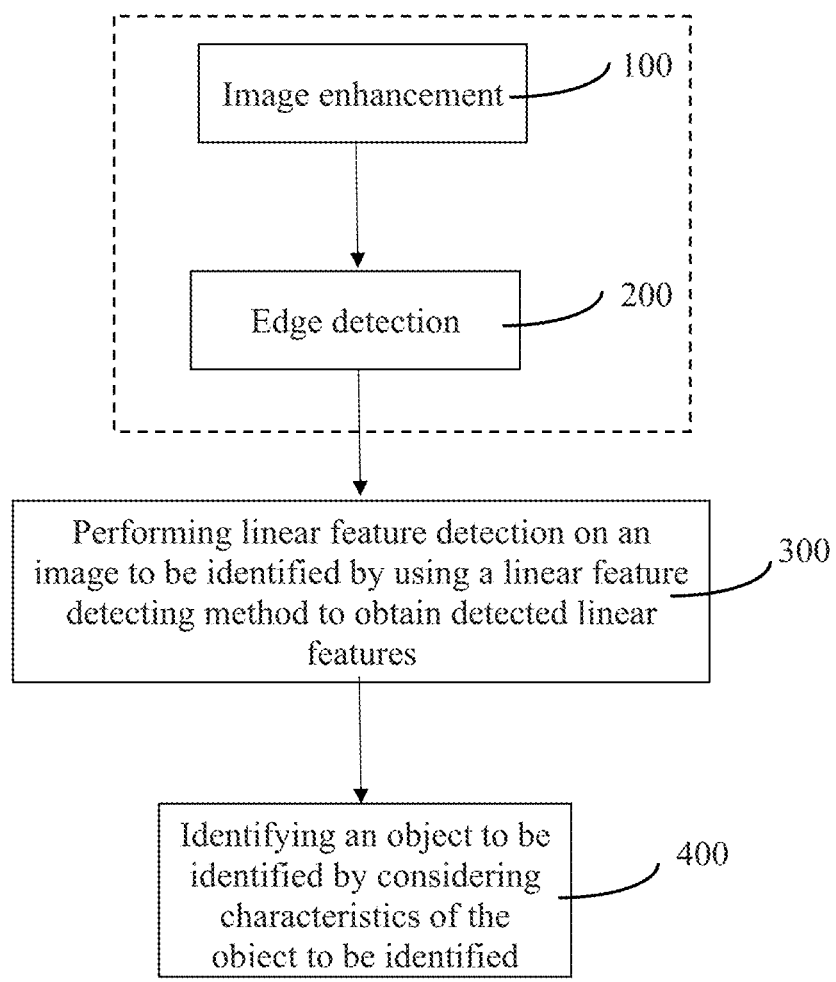
FIG. 1 schematically illustrates a flow chart of a method for identifying an object in accordance with an embodiment of the present invention.

As illustrated in FIG. 1, a method for identifying an object according to an embodiment of the present invention comprises the following steps:

300: Linear Feature Detection

In this step, a linear feature detecting method is used to detect linear features from an image to be identified to obtain detected linear features. The linear feature detection method of the invention transforms detection of linear features in an image space to detection of extremal points in another space and assigns larger weights to continuous image points than to discrete image points during the transformation by using a continuous cluster factor.

400: Identification of an Object to be Identified

In this step, the object to be identified is identified from the detected linear features by considering characteristics of the linear object to be identified. The above procedure is schematically illustrated in FIG. 1.

The high resolution remote sensing image to be identified may be a satellite image, a SAR image, a LiDAR image, a helicopter aerial image, or a UAV optical image. Such images contain many geographical information, such as forests, meadows, roads, buildings and power transmission lines. Weak objects in the images, such as power transmission lines and ship wakes, are the objects to be identified.

For the purpose of identifying weak linear objects from a high resolution remote sensing image, the image in the image space is transformed to another space through a transformation algorithm. Such a transformation converts a line in the image space to a point in the other space. As a result, an issue of identifying linear objects in the image is converted to an issue of finding extremal points in the other space. According to an embodiment of the invention, Radon transform is used to transform the image from the image space to the other space. Due to the very strong noise attenuation capability of Radon transform, it is possible to identify very weak linear objects from high resolution remote sensing mages.

Specifically, conventional Radon Transform may be defined in a space of any dimensions and in many forms. An exemplary 2-dimensional definition is as follows:

$$R(\rho, \theta) = \int_D f(x,y) \delta(x \cos \theta + y \sin \theta - \rho) dx dy \quad (1)$$

where D is the entire image plane, f(x, y) is a grayscale (or binary) value of an image point (i.e., a pixel) with coordinates (x, y) on the image to be identified, $\delta$ is a Dirac Delta function, $\rho$ is a distance between a straight line and the origin of the image plane (i.e., the (x,y) plane), $\theta$ is an angle between the normal from the origin to the straight line and the x-axis.

Figure 2:
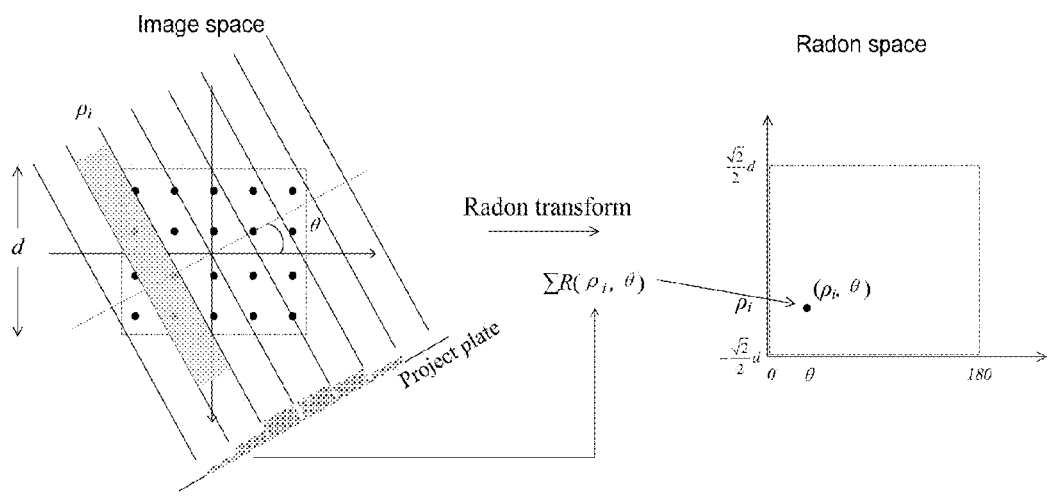
FIG. 2 schematically illustrates the principle of conventional Radon Transform.

With reference to FIG. 2, Radon transform of an image in the image space is essentially a projection across the image at varying orientation $\theta$ and offset $\rho$ relative to a set of parallel lines which are perpendicular to the line with $\theta$ angle. It is seen from FIG. 2 that Radon transform projects the image space to the Radon($\rho$, $\theta$) space by using a linear integral. One of the strips shown in gray in FIG. 2 is represented by a single point $(\rho_i, \theta)$ in the Radon space. After the Radon transform, straight lines in the image space are converted to points in the Radon space and the issue of line extraction in the image space is converted to the issue of finding a peak (bright line) or trough (dark line) in the Radon space.

However, when the conventional Radon transform is used to detect linear features, false alarms can be easily generated due to system noise caused by non-linear features. With reference to an image illustrated in FIG. 3, there is a straight line on the upper right side of the image, and a false line caused by system noise is present on the left side. The false line takes up seven pixels along its direction (the vertical direction) while the real line takes up only six pixels along its direction (a direction along about 135 degrees). The conventional Radon transform assigns identical weights to all pixels along a certain direction when projecting the image space to the Radon space. As a result, after projection a point in the Radon space that corresponds to the false line has a value larger than that of a point corresponding to the real line, allowing the false line, instead of the real line, to be identified first. When identifying weak objects such as power transmission lines, false alarms are quite common, due to the characteristics of weak linear objects of the power transmission lines and complicated background noise thereof. To solve this issue, the present invention introduces a continuous cluster factor $I_{\phi,r}$ to modify and improve the conventional Radon transform.

Specifically, the continuous cluster factor $I_{\phi,r}$ is a weight assigned to each pixel in the image space and configured to exaggerate the influence of continuous image points on computation results in the Radon space and to reduce the influence of discrete image points on the computation results in the Radon space. In other words, the continuous cluster factor $I_{\phi,r}$ assigns larger weights to continuous pixels than to discrete pixels during the Radon transform. As a result, the more continuous pixels there are along a certain direction, the larger the continuous cluster factors of these continuous pixels are, and the larger the value of the corresponding point in the Radon space is. On the contrary, if there are only discrete pixels along a direction, then the continuous cluster factors of the pixels along the direction will be smaller, making the value of the corresponding point in the Radon space smaller. By this means, it is possible to distinguish between real objects and noises in the image to be processed.

According to an embodiment of the invention, the continuous cluster factor $I_{\phi,r}$ may be defined in the form of the following equation:

$$I_{\varphi,r} = g(\varphi, r) = 1 - \frac{\sum_{m=i,n=j}^{r(r-1)/2} |f_{\rho,\theta}(x_m, y_n) - f_{\rho,\theta}(x_{m'}, y_{n'})|}{\sum_{m=i,n=j}^{r(r-1)/2} (f_{\rho,\theta}(x_m, y_n) - f_{\rho,\theta}(x_{m'}, y_{n'}))} \quad (2)$$

$$\left(m' > m, n' > n, \varphi = \frac{\pi}{2} + \theta\right)$$

where $f_{\rho,\theta}(x_m,y_n)$ is the value of a pixel $(x_m,y_n)$ along a direction $\phi$ and within a distance r relative to the pixel (x,y). If there is a linear object along a direction in the image to be identified, pixels on the linear object are continues pixels with identical or similar values. In contrast, pixels corresponding to noises along another direction are discrete pixels with values quite different from each other. Based on such facts, the above equation is used to compare all pixels along the direction $\phi$ and within the distance r against the pixel (x,y). In case the difference between values of two pixels is very small or even zero, the two pixels are continuous pixels, which are assigned relatively large weights. For two pixels whose values have a large difference, they are discrete pixels, and therefore assigned with relatively small weights.

The continuous cluster factor $I_{\phi,r}$ according to Equation (2) has a value of [0, 1]. When $I_{\phi,r}=1$, all pixels along the direction $\phi$ and within the distance r relative to the pixel (x,y) are clustered with the same value. On the other hand, any pixel $(x_m,y_n)$ is totally different from adjacent pixels along the direction $\phi$ and within the range r when $I_{\phi,r}=0$. Such pixels will be filtered as noises and will not contribute to the computed value in the Radon space.

The continuous cluster factor $I_{\phi,r}$ may also be in other forms, as long as it can assign larger weights to continuous pixels than to discrete pixels during the Radon transform. For example, the continuous cluster factor $I_{\phi,r}$ may be calculated using the following equation for binary images:

$$I_{\varphi,r} = g(\varphi, r) = \frac{\sum f_\varphi(x_i, y_j)}{r} \quad \left(\varphi = \frac{\pi}{2} + \theta\right) \quad (3)$$

The continuous cluster factor $I_{\phi,r}$ of this form is in proportion to a sum of all pixels along the direction $\phi$ and within the distance r. In other words, the more continuous pixels there are within a range, the larger the value of the continuous cluster factor $I_{\phi,r}$ is. On the other hand, the less continuous pixels there are within a range, the smaller the value of the continuous cluster factor $I_{\phi,r}$ is.

Figure 3:
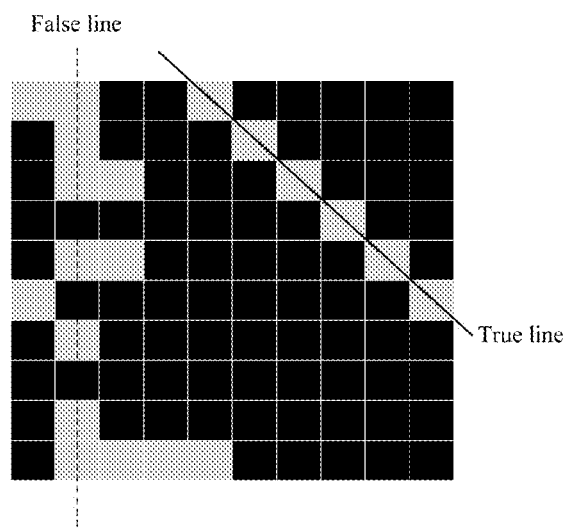
FIG. 3 schematically illustrates a false alarm generated by conventional Radom Transform.

With reference to the exemplary scenario of FIG. 3, the above equation (2) is used to calculate the false line from the pixel (1, 2) to the pixel (10, 2). Pixels shown in white have a value of 1 while those in black have a value of 0. Assuming that r=5, for each pixel having the value of 1, Equation (2) is used to calculate the cluster of five pixels starting from the pixel to obtain the continuous cluster factor of that pixel. For example, the continuous cluster factor of the pixel (1, 2) is 1−(0+0+1+0)/(2+2+1+2)=6/7. The continuous cluster factors of other pixels are found in a similar way. Finally, it is determined that R(ρ,θ) of the false line from pixel (1, 2) to pixel (10, 2) is 5.6, while R(ρ,θ) of the real pixel is still 6. As a result, the real line is identified first. In contrast, when the conventional Radon transform is used, R(ρ,θ) of the false line is 7 while that of the real line is 6, allowing the false line to be identified first. It is thus seen that the false alarm caused by discrete system noise is prevented by using the method of the invention.

The following equation is obtained by introducing the above continuous cluster factor $I_{\phi,r}$ into the conventional Radon transform:

$$R(\rho,\theta)=\int_D I_{\phi,r} f(x,y)\delta(x\cos\theta+y\sin\theta-\rho)dxdy \quad (4)$$

By using the above improved Radon transform, it is possible to accurately detect very weak linear objects in the high resolution remote sensing images. After that, the interested linear objects such as power transmission lines may be distinguished from other linear objects by considering unique characteristics thereof, thereby extracting the linear object to be identified.

Based on the identification results in the Radon space (ρ,θ), the line in the original image space may be reconstituted by using the equation below and then imposed on the original image:

$$y=(\rho/\sin\theta)-x\cot\theta \quad (5)$$

Moreover, bright surface objects in the image to be identified will negatively affect the result of the linear feature detection, thereby leading to false alarms during linear object identification. Therefore, as illustrated in FIG. 1, edge detection (step 200) may be performed on the image to be identified before the Radon transform to obtain an edge detection image, and then the improved Radon transform of the invention will be used to detect linear features of the edge detection image. According to an embodiment of the invention, an optimal edge detection operator is used to extract edge information of the image to be identified. One example of optimal edge detection operator is Canny operator.

Moreover, as illustrated in FIG. 1, for the purpose of further optimizing the identification result, image enhancement may be performed (step 100) before edge detection and linear feature detection. According to an embodiment of the invention, Curvelet transform and inverse Curvelet transform may be used to enhance the image to be identified, so as to reduce noise, improve contrast ratio and strengthen the linear edge features of the image to be identified, which will facilitate the identification of weak objects such as power transmission lines. According to another embodiment of the invention, fast discrete Curvelet transform may be used to enhance the original image. Other methods known to those skilled in the art may also be used to enhance the original image.

According to another embodiment of the invention, Hough transform is used to transform the image from the image space to the other space. By introducing the above continuous cluster factor into the conventional Hough transform, it is possible to suppress the system and ambient noises, thereby more accurately identifying weak linear objects from the image to be identified.

The method for identifying an object of the invention is described in the above. The method can be used to identify linear objects, such as power transmission lines and roads, in high resolution remote sensing images. In identifying weak linear objects in the high resolution remote sensing images, the method of the invention can effectively suppress the system noise and ambient noise, thereby avoiding false alarms caused by such noises.

In the following, detailed examples of using the above method to identify objects will be described.

EXAMPLE 1

Figure 4A:
FIGS. 4A-4D illustrate eliminating influence from bright surface objects and identifying linear objects by using the method of the invention.
Figure 4B:
Figure 4C:
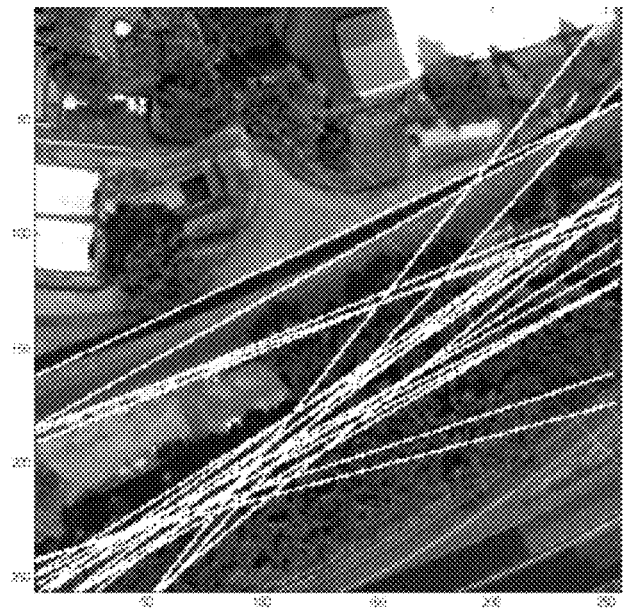
Figure 4D:
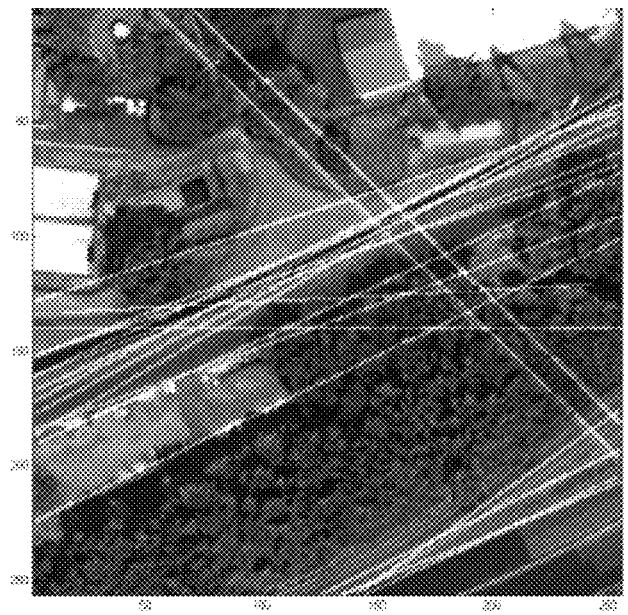

FIG. 4A illustrates a synthetic image having a real satellite image as a background which includes forests, buildings, and roads. Two power transmission lines run from the upper left to the lower right of the image. Two roofs at the left middle part and the right corner of the image are bright surface objects. FIG. 4B illustrates an identification result obtained through the conventional Radon transform, wherein almost all identified lines are false alarms caused by the two bright roofs. FIG. 4C illustrates an identification result obtained through the conventional Radon transform after edge detection. It is seen from FIG. 4C that although the influence from the bright surface objects is eliminated, there are still false alarms caused by the forests. FIG. 4D illustrates an identification result obtained by performing linear feature detection through the method of the invention after edge detection. It is seen form FIG. 4D that both simulated power transmission lines are accurately identified. Thereafter, the power transmission lines can be extracted from the image by considering characteristics thereof

EXAMPLE 2

Figure 5A:
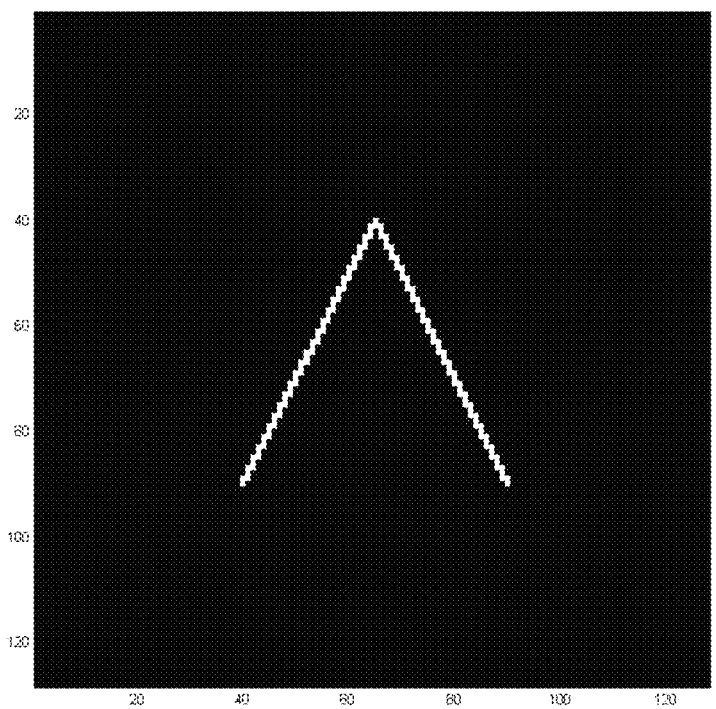
FIGS. 5A-5E illustrate identifying simulated ship wake by using the method of the invention.
Figure 5B:
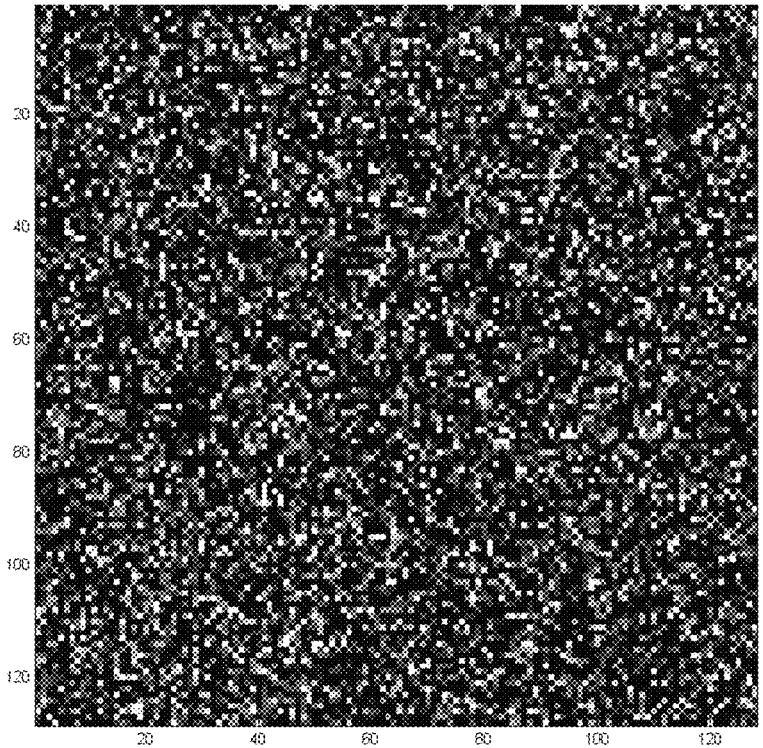
Figure 5C:
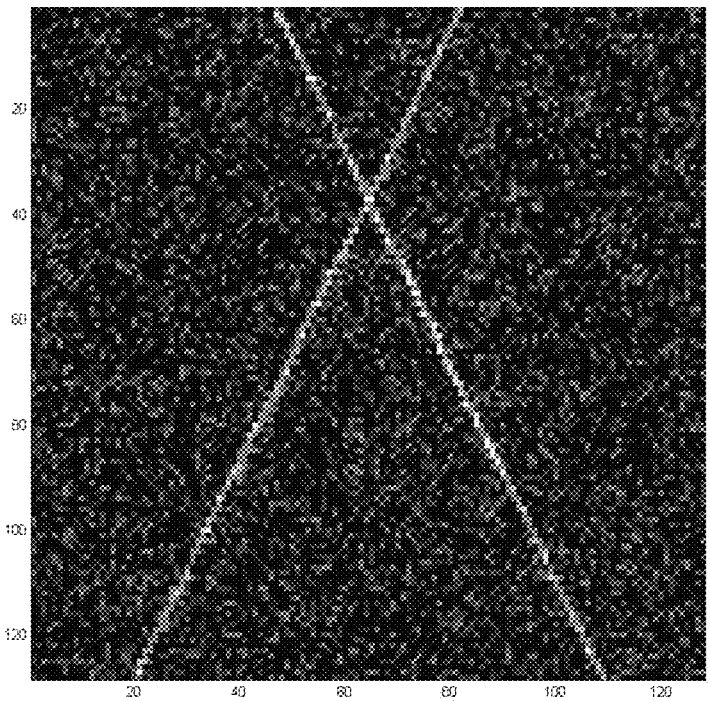
Figure 5D:
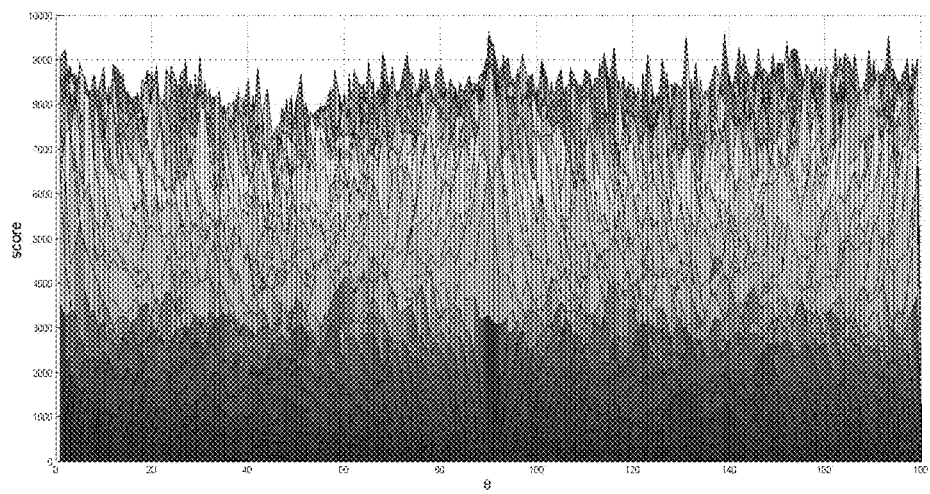
Figure 5E:
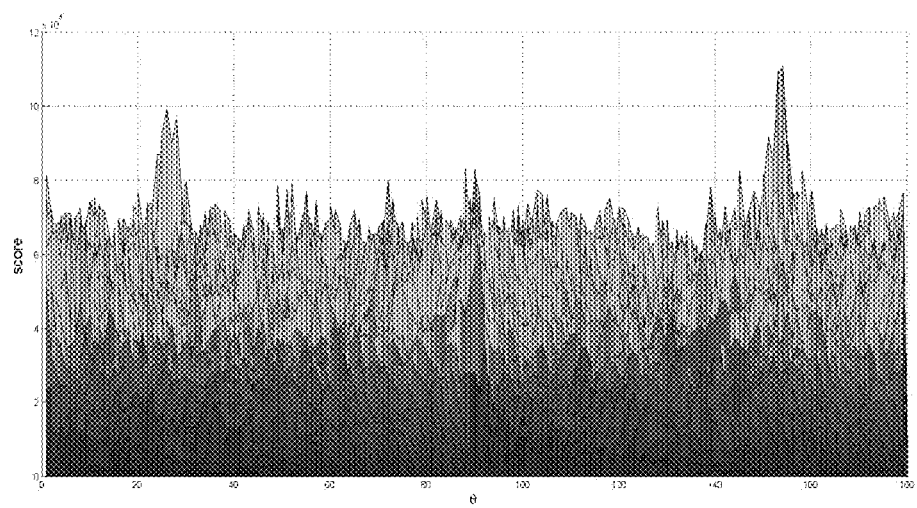

A synthetic image of FIG. 5A includes short line segments for simulating ship wake; such V-shaped ship wake may be used to track ships. The image of FIG. 5A is corrupted by a white Gaussian noise with a variance of 5 to obtain an image to be processed of FIG. 5B. FIG. 5C illustrates an identification result obtained by using the method for identifying an object to identify FIG. 5B. It is seen from FIG. 5C that the method of the invention can also successfully identify short segments. FIG. 5D and FIG. 5E are 2-D profiles in the Radon space when the conventional Radon transform and the method of the invention are respectively used to detect linear features. It is seen by comparing the two images that the method of the invention effectively suppresses the noises and enhances two short line segments as the linear features to be identified. Two peaks in FIG. 5E respectively correspond to the two segments in the original synthetic image.

EXAMPLE 3

Figure 6A:
FIGS. 6A-6D illustrate identifying power transmission lines from a satellite image by using the method of the invention.
Figure 6B:
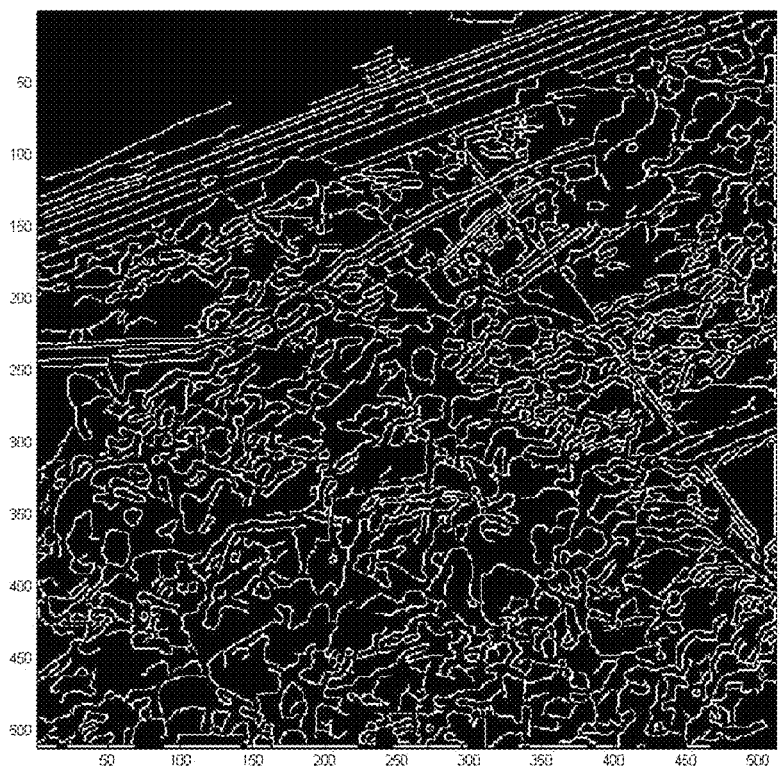
Figure 6C:
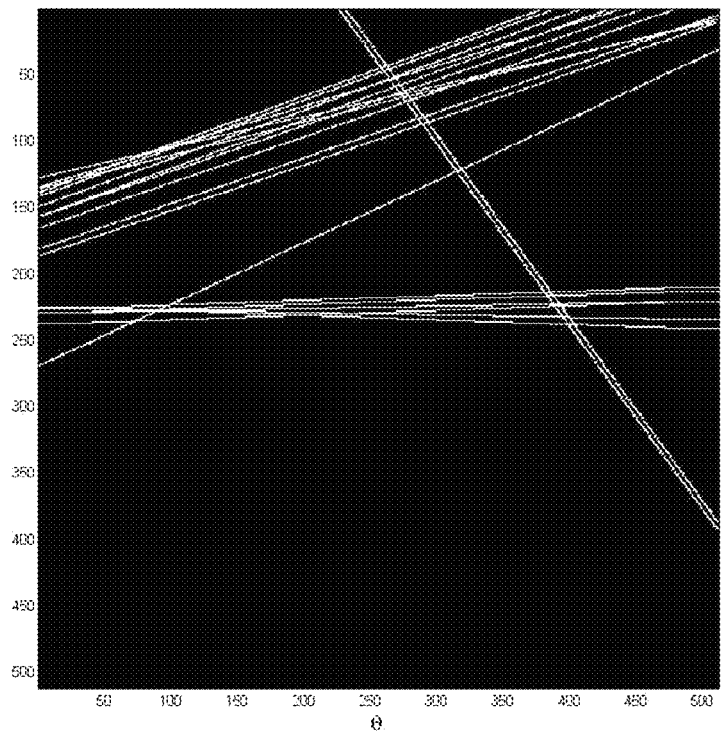

FIG. 6A is an original image to be processed, which is a 512×512 GeoEye-1 remote sensing image. It is seen from FIG. 6A that in the remote sensing image there is a pair of power transmission lines running obliquely from the north to the southeast, with a very complicated background including bare lands, roads, a transformer substation and a large tract of woodland in the south. In this sense, there are a lot of noises which make it difficult to identify and extract the power transmission lines. The result of edge detection of FIG. 6A is illustrated in FIG. 6B, which shows that many system noises exist. FIG. 6C illustrates an object identification result obtained by using the method of the invention. It is seen from FIG. 6C that roads in the image to be processed are also identified, in addition to the power transmission lines that are of concern. In this case, the following characteristics of the power transmission lines to be identified are considered, such that the power transmission lines may be distinguished from other objects.

i) Having a simple topological structure, being generally straight and long, and running through the whole or a part of the high-resolution remote sensing image;

ii) Having a width of 1-2 pixels;

iii) Being parallel to each other; and iv) Having a complicated background including natural features such as forests, rivers, and man-made features such as roads and buildings.

In addition to the above four characteristics, in order to distinguish the power transmission lines from other linear objects, a fifth characteristic is considered:

v) Having similar backgrounds in-between and on both sides, which is different from other linear features such as road boundary.

Figure 6D:

The power transmission lines are identified from FIG. 6C successfully by considering above characteristics and then imposed on the original image to achieve the result of FIG. 6D.

EXAMPLE 4

Figure 7A:
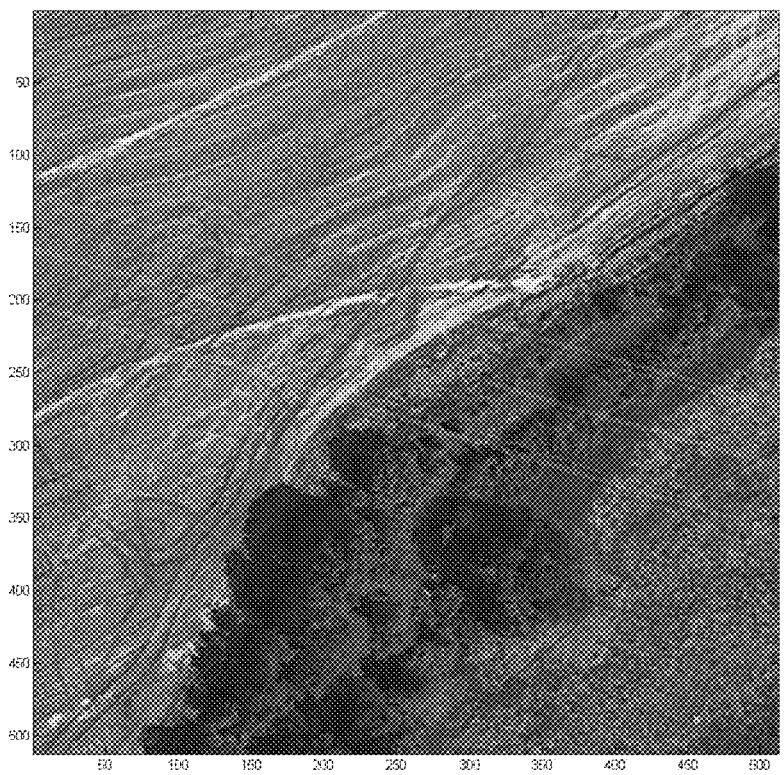
FIGS. 7A-7C illustrate identifying power transmission lines from a Google earth image by using the method of the invention.
Figure 7B:
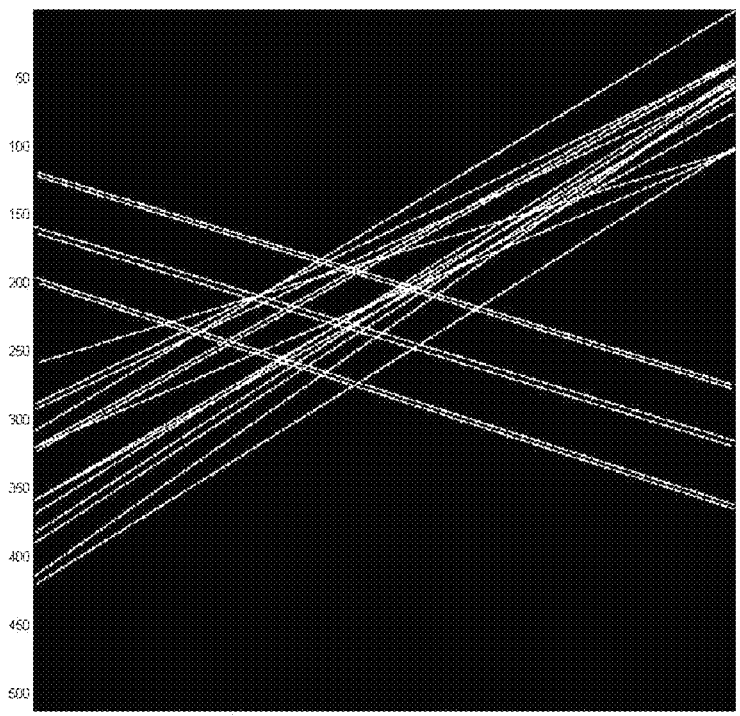
Figure 7C:
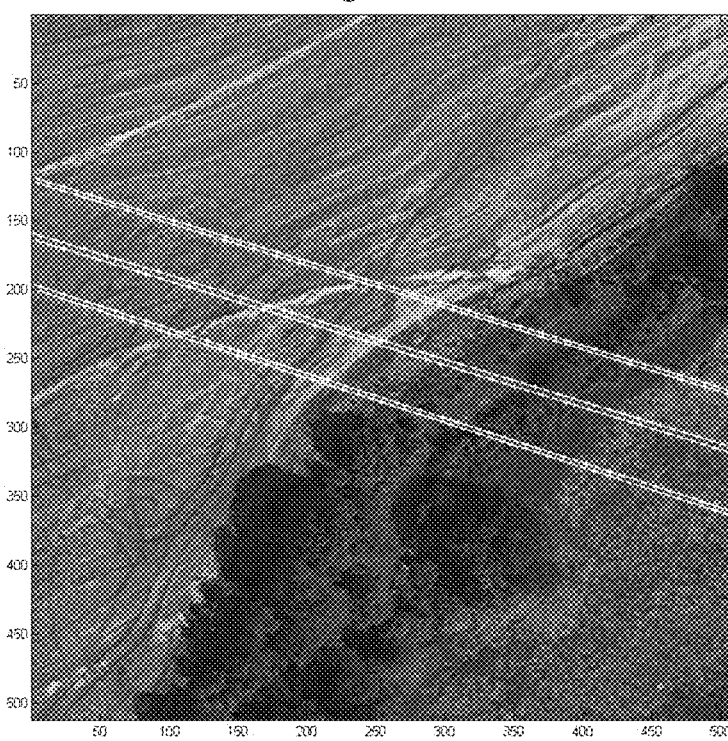

FIG. 7A illustrates an image to be identified which is a google earth image with a resolution of 512×512. The image of FIG. 7A includes three kinds of geographic features, that is, bare lands, forests and meadows, and three pair of power transmission lines running through the whole image from the northwest to the southeast. FIG. 7B illustrates an object identification result obtained by using the method of the invention to process the original image, clearly showing the three pairs of power transmission lines and other linear features. FIG. 7C illustrates the identification result obtained after considering the characteristics of the power transmission lines. It is seen from FIG. 7C that the method of the invention may be directly used to identify objects from the image to be identified which does not have bright surface objects. In this way more details of the original image may be kept such that a better identification result is achieved.

It is seen from the above examples that the method for identifying an object of the invention, when used to detect and identify weak linear objects in high resolution remote sensing images, can effectively suppress the system noise and ambient noise, thereby successfully identifying the interested object and avoiding false alarms. Moreover, the method of the invention can also detect short line segments.

Figure 8:
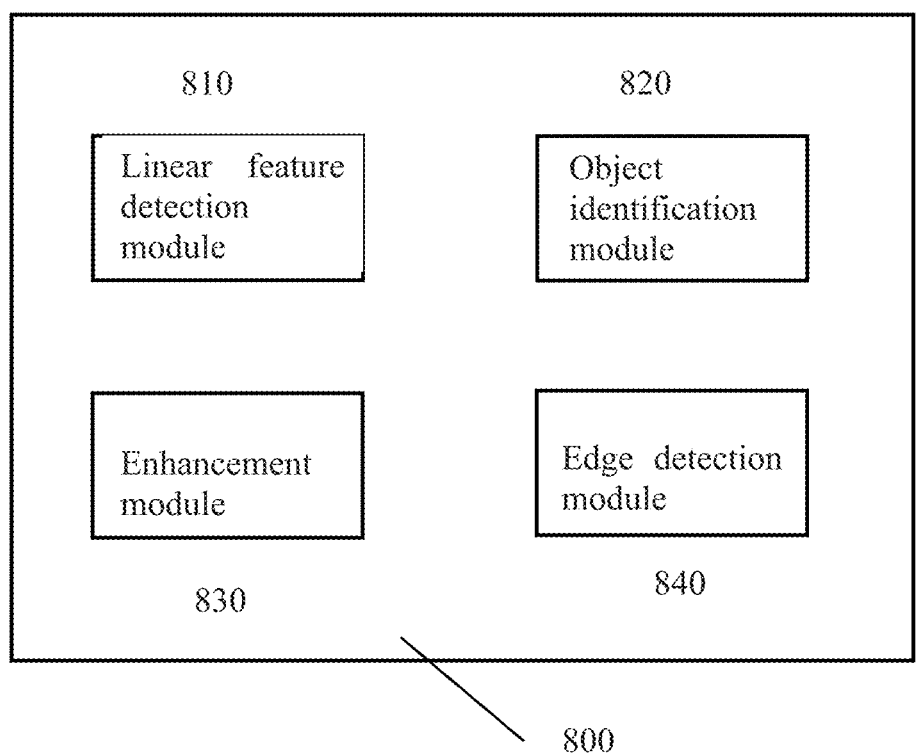
FIG. 8 schematically illustrates an apparatus for identifying an object in accordance with an embodiment of the present invention.

Another aspect of the invention provides an apparatus for identifying an object 800. As illustrated in FIG. 8, the apparatus for identifying an object 800 of the invention comprises: a linear feature detection module 810, which is configured for detecting linear features of an image to be identified to obtain detected linear features. The detection of the linear features transforms detection of linear features in the image space to detection of extremal points in another space and assigns larger weights to continuous image points than to discrete image points during the transformation by using a continuous cluster factor. Moreover, the apparatus for identifying an object 800 of the invention further comprises an object identification module 820, which is configured for identifying a linear object to be identified from the detect linear features by considering characteristics of the linear object to be identified.

Furthermore, the apparatus for identifying an object 800 of the invention may also comprise an enhancement module 830 and an edge detection module 840. The enhancement module 830 is configured for enhancing the image to be identified to obtain an enhanced image. The edge detection module 840 is configured for performing edge detection on the image to be identified to obtain an edge detection image. The image enhancement and edge detection may strengthen linear features in the image to be identified and eliminate influence from bright surface objects, thereby optimizing the identification result.

Here, the transform of the detection of linear features in the image space to the detection of extremal points in another space is done through Radon or Hough transform. For detailed transformation please refer to the description in connection with the above method for identifying an object of the invention, which will not be elaborated here.

The above apparatus for identifying an object of the invention may be used to process high resolution remote sensing images, such that weak linear objects such as power transmission lines, ship wakes and a like may be identified. When being used to identify weak linear objects in high resolution remote sensing images, the apparatus for identifying an object of the invention can effectively suppress the system noise and ambient noise, thereby successfully identifying the interested object and avoiding false alarms. Moreover, the apparatus of the invention can also detect short line segments.

The above is only the preferred embodiment of the invention and is not intended to limit the invention. For a person skilled in the art, the invention may have a variety of changes and modifications. Any change, equivalent replacement, or improvement made within the spirit and principle of the present invention should be included in the protection scope of the invention.

What is claimed is:

1. A method for identifying an object, comprising:
    performing linear feature detection on an image to be identified by using a linear feature detecting method to obtain detected linear features, wherein the linear feature detection method transforms detection of linear features in an image space to detection of extremal points in another space and assigns larger weights to continuous image points than to discrete image points during the transformation by using a continuous cluster factor;
    identifying an object to be identified from the detected linear features by considering characteristics of the object to be identified; and
    wherein the continuous cluster factor is in reverse proportion to a difference between adjacent image pixels along a two-dimensional direction of the image to be identified.

2. The method of claim 1, further comprising performing image enhancement and edge detection on the image to be identified before linear feature detection to eliminate influence of bright surface objects on the detection.

3. The method of claim 1, wherein the continuous cluster factor is in proportion to a sum of continuous image pixels having similar or equal value along a two-dimensional direction of the image to be identified.

4. The method of claim 1, wherein the transformation from the image space to the other space is done through Radon transform.

5. The method of claim 1, wherein the transformation from the image space to the other space is done through Hough transform.

6. The method of claim 1, wherein the characteristics of the linear object to be identified comprises at least one of the following:
    i) long and straight, covering part of the image to be identified or running through the image to be identified;
    ii) having a width of 1 to 2 pixels;
    iii) being parallel to each other; and
    iv) having similar backgrounds in-between and on both sides.

7. The method of claim 6, wherein the object to be identified is power transmission lines.

8. The method of claim 6, wherein the object to be identified is ship wake.

9. An apparatus for identifying an object, comprising:
    a linear feature detector for detecting linear features of an image to be identified to obtain detected linear features, wherein detecting the linear features transforms detection of linear features in an image space to detection of extremal points in another space and assigns larger weights to continuous image points than to discrete image points during the transformation by using a continuous cluster factor;
    an object identification circuitry for identifying a linear object to be identified from the detected linear features by considering characteristics of the linear object to be identified; and
    wherein the continuous cluster factor is in reverse proportion to a difference between adjacent image pixels along a two-dimensional direction of the image to be identified.

10. The apparatus of claim 9, further comprising an enhancement circuitry for enhancing the image to be identified.

11. The apparatus of claim 9, further comprising an edge detector for performing edge detection on the image to be identified.

12. The apparatus of claim 9, wherein the continuous cluster factor is in proportion to a sum of continuous image pixels having similar or equal value along a two-dimensional direction of the image to be identified.

13. The apparatus of claim 9, wherein the transformation from the image space to the other space is done through Radon transform.

14. The apparatus of claim 9, wherein the transformation from the image space to the other space is done through Hough transform.

* * * * *